United States Patent [19]

Angst

[11] 4,037,497
[45] July 26, 1977

[54] TOOL HOLDER WITH FINE INFEED

[76] Inventor: Fritz Angst, Breitenmatt 1362, Oberdurnten, Switzerland

[21] Appl. No.: 719,208

[22] Filed: Aug. 31, 1976

[30] Foreign Application Priority Data

Sept. 9, 1975    Switzerland .................. 11671/75

[51] Int. Cl.² ............................................. B23B 29/00
[52] U.S. Cl. .................................. 82/36 R; 82/24 R
[58] Field of Search ............................ 82/24 R, 36 R

[56] References Cited

U.S. PATENT DOCUMENTS

| | | | |
|---|---|---|---|
| 2,908,963 | 10/1959 | Gollus | 82/36 R |
| 3,101,020 | 8/1963 | Ditto | 82/36 R |
| 3,153,370 | 10/1964 | Heimall | 82/24 R |
| 3,477,319 | 11/1969 | Koppelmann | 82/24 R |
| 3,580,216 | 5/1971 | Weber | 82/24 R |

*Primary Examiner*—Harrison L. Hinson
*Attorney, Agent, or Firm*—Ladas, Parry, Von Gehr, Goldsmith & Deschamps

[57] ABSTRACT

A tool holder with fine infeed comprising a base body and a slide displaceably guided therein, the base body being structured for attachment to a member, such as a machine support or a work spindle. The slide is intended to receive a work tool. An infeed-threaded spindle is threadably retained in the slide, the thread play of the infeed-threaded spindle is eliminated by at least one spring. The spindle is mounted by means of three axial and two radial bearing locations relative to the slide and the base body. The outermost bearing location facing away from the spindle threading is constructed as an axial and radial swing or pivot bearing, and the pivot bearing as well as the neighboring bearing location forming an axial bearing are clamped to one another free of play.

8 Claims, 3 Drawing Figures

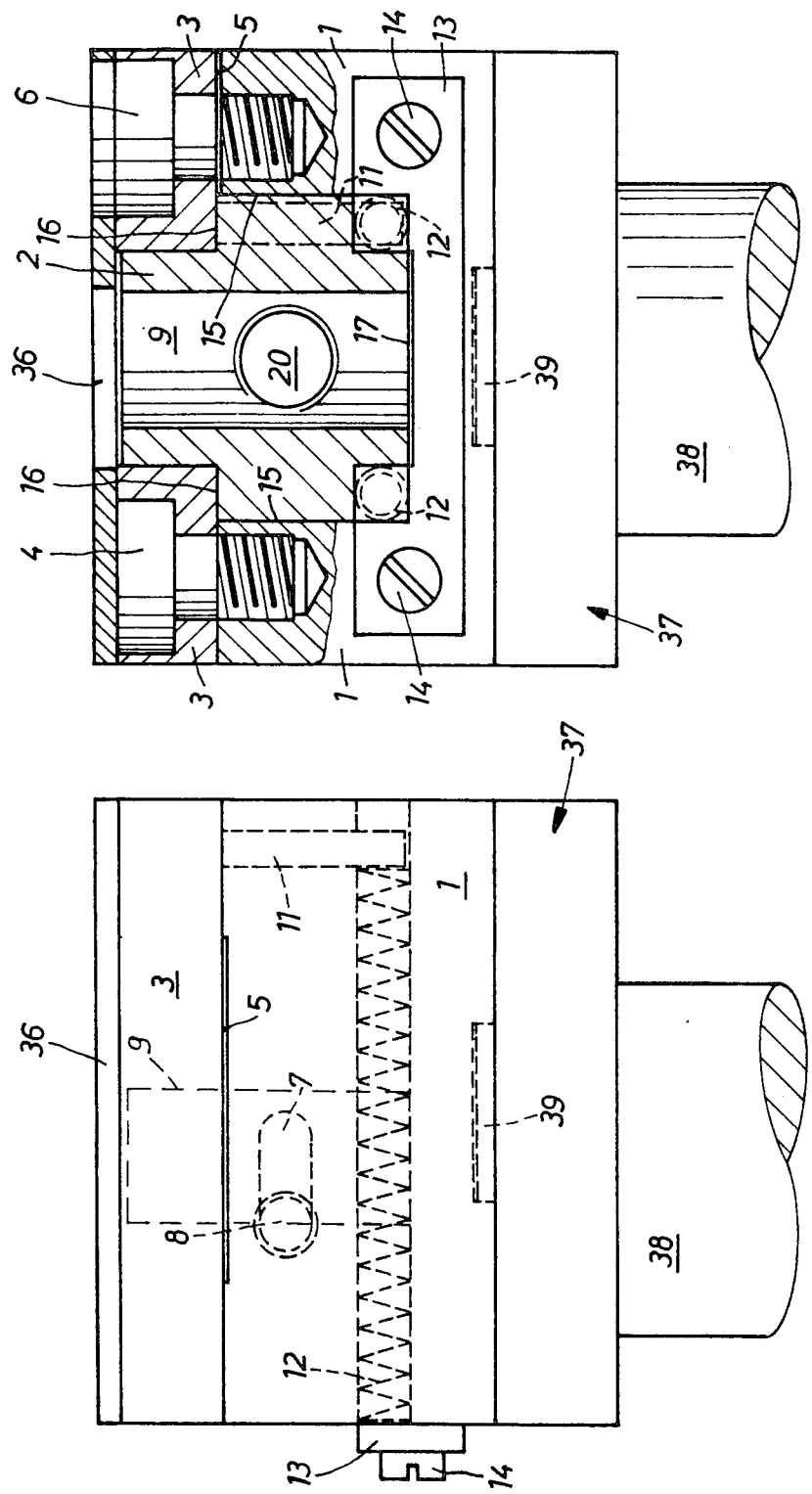

TOOL HOLDER WITH FINE INFEED

BACKGROUND OF THE INVENTION

The present invention relates to a new and improved construction of a tool holder of the type having a fine infeed, wherein the holder comprises a base body and a slide displaceably guided therein, the base body is constructed for attachment to a machine support or a work spindle, and the slide is intended to receive a work tool.

There has always been a large demand for tool holders which permit of a very precise adjustment of the tool. With the heretofore known tool holders there is only possible an exact infeed of the tool, but not any equally exact return setting or movement of the tool. Such return setting of the tool would be extremely advantageous since in practice there also is desirable accurate correction of the tool position in the rearward setting. However, this requires a mounting of the infeed-threaded spindle which is free of play, something which heretofore was not possible.

SUMMARY OF THE INVENTION

Hence, it is a primary object of the present invention to provide a new and improved construction of tool holder which is not associated with the aforementioned drawbacks and limitations of the prior art constructions.

Another and more specific object of the present invention aims at the provision of a novel construction of tool holder having a fine infeed wherein there can be attained a mounting of the threaded spindle which is free of play.

A further but also important object of the present invention resides in the provision of a new and improved construction of tool holder which is simple and compact.

Now in order to implement these and still further objects of the invention, which will become more readily apparent as the description proceeds, the tool holder with fine infeed as contemplated by the invention is manifested by the features that an infeed-threaded spindle is threadably supported in the slide, the thread play of the infeed-threaded spindle is eliminated by at least one spring. Further, the spindle is mounted by means of three axial and two radial bearing locations relative to the slide and the base body. The outermost bearing location located facing away from the spindle threads is constructed as an axial and radial swing or pivot bearing, and the aforesaid swing or pivot bearing as well as the neighboring location forming an axial bearing are clamped with one another free of play.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a cross-sectional view, taken substantially along the line II—II of FIG. 1; and FIG. 3 is a side view of the tool holder.

DETAILED DESCRIPTION OF THE PREFERRED EMBODIMENTS

Figure 1:
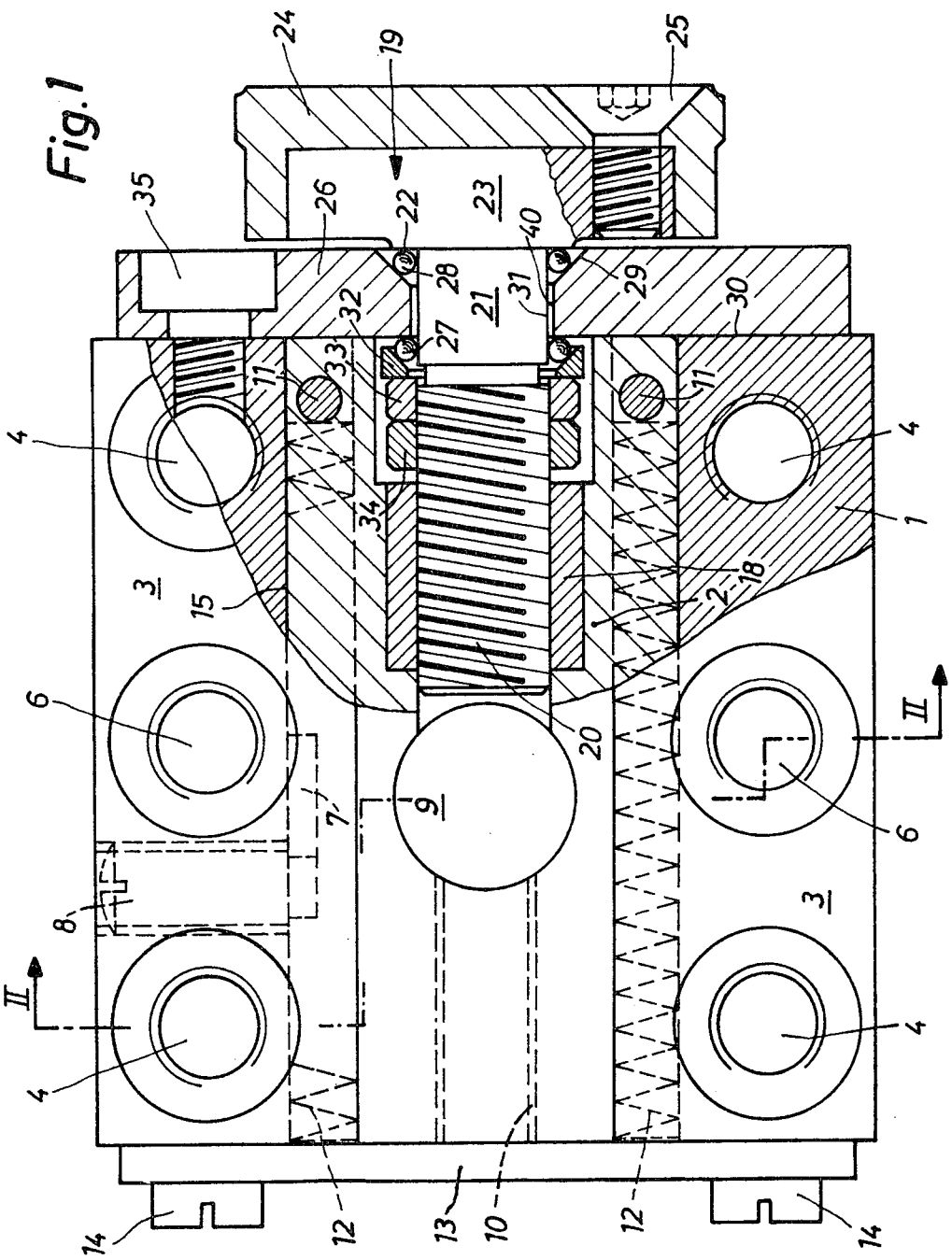
FIG. 1 is a plan view, partially in section, of the tool holder with the cover plate removed to reveal internal structure.

Describing now the drawings, the exemplary embodiment of tool holder of the present invention will be seen to comprise a one-piece base body 1 which in cross-section is of substantially U-shape and a slide 2 guided displaceably therein, the cross-sectional shape of the slide 2 being apparent from the showing of FIG. 2. The base body 1 is equipped with two upper parallel juxtapositioned rails 3, by means of which upward movement of the slide 2 is limited. The slide 2 can be considered to possess a substantially cross-shaped configuration in cross-section. Both of the guide rails 3 are attached by means of two respective screws at the base body 1. In FIG. 1 there have only been shown, to preserve clarity in illustration, the threaded holes 4 necessary for this purpose. Each leg of the U-shaped base body 1 is provided at its central region with a recess 5, and each recess 5 is pierced by a clamping screw. Again in FIG. 1 there have only been illustrated both of the holes 6 needed for this purpose. Upon tightening both clamping screws the guide rails 3 are deformed somewhat into the recesses 5 and fixedly clamp the slide 2 in the base body 1. This is accomplished before working with the tool holder. Such clamping influences the adjusted cutting or lathe work.

The slide 2 is displaceable to a limited extent within the base body 1. Limiting of the displacement is achieved by means of an elongate hole or slot 7 provided in the slide 2 and a set screw 8 seated in the base body 1. The screw 8 extends by means of a plug into the elongate hole 7. The slide 2 is pierced by a throughpassage hole 9 serving for the reception of the shaft of a not particularly illustrated work tool. Such work tool is fixably held in the slide 2 by means of a not particularly illustrated clamping screw or equivalent structure seated in the threaded hole 10. In the slide 2 there are seated two pins 11, which serve to support a respective compression spring 12. The other end of each such compression spring 12 is supported at a support plate 13 attached by means of two screws 14 or equivalent structure at the base body 1. Both of the springs 12, in the illustration of FIG. 2, are located symetrically with respect to the slide 2 and extend along its lengthwise sides.

The slide 2 has seating surfaces 15, 16 and 17, and the seating surfaces 15 and 16 are present in pairs. The onepiece base body 1 has corresponding seating or fitting surfaces which co-act with the seating or fitting surfaces 15–17. All seating surfaces are ground, and it will be apparent from FIG. 2 that the slide 2 can be seated very compactly, free of play, in the likewise compact base body 1.

In the description to follow there will now be considered the forward and rearward fine adjustment free of play. In the slide 2, formed for instance of steel, there is mounted a brass bushing or sleeve 18 having a fine threading. Threaded into such bushing 18 is a threaded spindle 19. The spindle 19 has a thread section or portion 20, a threadless cylindrical projection or shoulder 21, a planar or flat end surface 22, and a collar 23 of larger diameter. Upon the collar 23 there is attached a hood 24 by means of the screws 25 or equivalent fastening expedients, wherein the hood 24 is provided over its periphery with a not particularly illustrated scale division. The spacing of two neighboring scale lines can correspond, for instance, to a displacement of the slide through 0.01mm. Upon the cylindrical shoulder 21 of the spindle 19 there is freely rotatably mounted by means of the balls 27 and 28 a bearing plate 26. This bearing plate 26 possesses a ground conical surface 29 and a ground planar or flat end surface 30. The balls 28 extend over the entire periphery and together with the conical surface 29, the end surface 22 and the jacket or outer surface 31 form a ball bearing, each ball 28 being supported or bearing at three points, as best seen by referring to FIG. 1. The ball bearing 22, 28, 29 and 31 constitutes an axial-, radial- and swing or pivot bearing. The other roller bearing for the bearing plate 26 consists of the balls 27 extending over the periphery, the jacket or outer surface 31, the flat or planar end surface 30 and a loose bearing race or ring 32 which is radially freely movable. Each ball 27 likewise bears at three points. The ball bearing 27, 30, 31 and 32 constitutes an axial bearing. Both of the ball bearings with the intermediately situated bearing plate 26 are clampingly held upon the infeed spindle 19 by means of a nut 33. There is also provided a counter nut 34. The bearing plate 26 is attached at the base body 1 by means of screws or the like and, again to simplify the showing of the drawing, there has only been illustrated one threaded hole 35. The bearing plate 26 is further provided with a not particularly illustrated index mark, in other works for instance an index line, which is located in confronting relationship to the aforementioned scale division at the hood 24.

By clamping both of the ball bearings 27 and 28 at the spindle 19, the latter mounted to be free of play in axial direction, but in radial direction is mounted so as to be capable of pivoting or swinging in the bearing plate 26. Both of the springs 12 serve for the axial and radial mounting of the infeed spindle 19 free of play in the slide 2. These springs 12 strive to displace the slide 2 and thus the threaded spindle 19 with the bearing plate 26 to the right of FIG. 1. Since the bearing plate 26 however is secured at the base body 1 always the same thread flanks of the slide and spindle are pressed against one another by the force of the springs 12. There is thus present a threaded interconnection between the brushing 18 and the spindle 19 which is free to play. This threaded connection of the spindle in the slide free of play is present in both rotational directions of the spindle. The same thread flanks which always bear against one another constitute an axial- and radial bearing for the spindle 19. This infeed-spindle 19 is axially mounted free of play at three locations. Two axial bearings or supports are provided by the balls 27 and 28, and the third axial bearing or support is provided by the threaded flanks between the bushing 18 and the thread portion or section 20. The spindle 19 is furthermore radially mounted by two bearings. The one radial bearing or support is likewise constituted by the balls 28 and the other radial bearing or support is achieved likewise by the threaded flanks between the bushing 18 and the shoulder 20. The balls 27 do not take-up any radial forces in order to prevent a double fixation. A threefold radial mounting of the spindle 19 would be statically indeterminable. What is important in this regard is that the end surface 30 of the bearing plate 26 is completely flat at least at the region of the balls 27, in other words does not possess any race for the balls 27, so that the balls can freely move in the plane of the surface 30 when the spindle 19 pivots or oscillates about the bearing locations 22, 28, 29 and 31. In practice, the surface 30 as well as the adjoining surface of the base body 1 are hardened and ground.

The assembly of the previously disclosed tool holder occurs in the following manner: with the screw 8 retracted, and after insertion of both springs 12 into the base body 1, the slide 2 is pushed into the base body 1 and the screw 8 threaded-in. Then the finally assembled spindle 19 is threaded into the slide 2. The finally assembled spindle 19 carries the bearing plate 26 together with both of the ball bearings 27, 28 as well as the bearing ring 32, both of the nuts 33 and 34 as well as the scale hood or hood member 24. After the threading-in of the finally assembled spindle 19 into the slide 2 the bearing plate 26 bears, against the force of the springs 12, against the base body 1 and is fastened to the base body by means of screws inserted into the holes 35. The angular inaccuracies, unavoidable during the assembly work, with respect to the axial centre (alignment) between the threaded bushing 18 and the spindle 19 as well as the transversely situated flat or planar surface 30 of the bearing plate 26 and the base body 1 are compensated by virtue of the possibility of pivoting or swinging the spindle 19 in the ball bearing 22, 28, 29 and 31. For this purpose, there is present the play 40 between the threaded spindle 19 and the bearing plate 26. The balls 28 can appropriately seat themselves at the conical surface 29 and the balls 27 with the bearing ring 32 can radially shift upon the flat surface 30. However, both of the bearings 27 and 28 are still subjected to the axial mutual clamping or tensioning. Due to the aforedescribed possibility of pivotal or swinging movement, there is eliminated any binding between the base body 1, slide 2, threaded spindle 19 and bearing plate 26, and nonetheless in the axial direction there is obtained a positioning of the spindle which is completely free of play. Consequently, there is realized a completely uniform fine adjustment — without any hard, irregular i.e. jerky movements — between the slide 2 and the base body 1.

At the top the tool holder is provided with a cover plate 36 which has been omited in FIG. 1 to preserve clarity in illustration. This cover plate 36 only permits free access from the outside to both of the clamping screws which are seated in the holes 6 and has an elongate hole which permits the insertion of a work or working tool in each displaced position of the slide. At the underside of the base body there is threadably connected a holder plate 37. A projection or shoulder 39 provided at the holder plate 37 is located eccentrically with respect to the holder shaft 38. The projection or shoulder 39 is rotatably seated in an appropriate recess of the base body 1. By rotating the holder plate 39 through 180° it is possible to markedly increase the adjustment range of the tool holder. By means of the holder shaft 38 the tool holder is secured to a member, such as either a stationary machine support or a rotatable work spindle.

With the tool holder the relevant tool can be employed at all machine tools both with stationary tools as well as with rotating tools. Moreover, the tool holder has a low and compact construction in its entirety. Furthermore, it provides a precise forward and return micrometer-fine adjustment free of play. It also has a simple construction and can be fabricated economically.

While there are shown and described present preferred embodiments of the invention, it is to be distinctly understood that the invention is not limited thereto, but may be otherwise variously embodied and practiced within the scope of the following claims.
ACCORDINGLY,

What is claimed is:

1. A tool holder with fine infeed, comprising a base body, a slide, means for displaceably guiding the slide in said base body, said slide being adapted to receive a work tool, an infeed-threaded spindle threadably retained in said slide, said threaded spindle having thread play, at least one spring for eliminating said thread play, means for providing three axial bearing locations and two radial bearing locations for mounting the spindle with respect to the slide and the base body, said bearing locations including an outermost bearing location situated facing away from the threads of the spindle and structured as an axial and radial pivot bearing, and means for interconnecting with one another free of play said pivot bearing and a neighboring bearing location of said bearing locations forming an axial bearing.

2. The tool holder as defined in claim 1, wherein the base body is adapted to be secured to a machine support.

3. The tool holder as defined in claim 1, wherein the base body is adapted to be secured to a work spindle.

4. The tool holder as defined in claim 1, including a bearing plate mounted upon the threaded spindle by means of the pivot bearing and the axial bearing interconnected therewith, means for securing the bearing plate at the base body.

5. The tool holder as defined in claim 1, wherein said at least one spring is constructed as a compression spring having opposed ends, one end of the compression spring bearing against the base body and the opposite end against the slide.

6. The tool holder as defined in claim 5, wherein two of said compression springs are provided which are symmetrically arranged with respect to the slide along lengthwise sides thereof.

7. The tool holder as defined in claim 1, wherein the interconnected bearing locations comprise roller bearings have roller bodies and races, the roller bodies each possessing a three-point contact with their associated race.

8. The tool holder as defined in claim 7, wherein each said threaded spindle and the bearing plate have bearing surfaces for the roller bodies, and an additional race provided for one of the axial bearings.

* * * * *